(12) United States Patent
Ooya

(10) Patent No.: US 8,733,175 B2
(45) Date of Patent: May 27, 2014

(54) PRESSURE SENSOR

(75) Inventor: Kouji Ooya, Anjo (JP)

(73) Assignee: DENSO CORPORATION, Kariya (JP)

( * ) Notice: Subject to any disclaimer, the term of this patent is extended or adjusted under 35 U.S.C. 154(b) by 196 days.

(21) Appl. No.: 13/424,622

(22) Filed: Mar. 20, 2012

(65) Prior Publication Data

US 2012/0240683 A1    Sep. 27, 2012

(30) Foreign Application Priority Data

Mar. 23, 2011 (JP) .................... 2011-64736
Jan. 27, 2012 (JP) .................... 2012-15640

(51) Int. Cl.
*G01L 7/00* (2006.01)
*G01L 19/14* (2006.01)

(52) U.S. Cl.
CPC .................... *G01L 19/147* (2013.01)
USPC ........................................... 73/706

(58) Field of Classification Search
CPC .................................... G01L 19/147
USPC .................................... 73/700–756
See application file for complete search history.

(56) References Cited

U.S. PATENT DOCUMENTS

| | | | |
|---|---|---|---|
| 5,499,535 A * | 3/1996 | Amano et al. | 73/717 |
| 6,945,120 B1 | 9/2005 | Marcus et al. | |
| 2005/0103111 A1 * | 5/2005 | Imai et al. | 73/715 |
| 2006/0000265 A1 | 1/2006 | Parker et al. | |
| 2006/0000288 A1 | 1/2006 | Pham et al. | |
| 2006/0288793 A1 * | 12/2006 | Tanaka | 73/754 |
| 2006/0289415 A1 * | 12/2006 | Muehlheim et al. | 219/209 |
| 2007/0029657 A1 * | 2/2007 | Takahata et al. | 257/680 |
| 2008/0006093 A1 | 1/2008 | Ueya | |
| 2009/0071259 A1 * | 3/2009 | Tanaka et al. | 73/725 |
| 2009/0090190 A1 | 4/2009 | Ueya | |
| 2010/0077862 A1 | 4/2010 | Benzel et al. | |
| 2012/0001278 A1 | 1/2012 | Ooya | |

FOREIGN PATENT DOCUMENTS

| | | |
|---|---|---|
| JP | 57194327 A | 11/1982 |
| JP | A-59-123276 | 7/1984 |
| JP | A-63-57540 | 4/1988 |
| JP | 05-133827 A | 5/1993 |
| JP | A-10-170367 | 6/1998 |
| JP | 11248571 A | 9/1999 |
| JP | 2000346736 A | 12/2000 |
| JP | 2001059789 A | 3/2001 |

(Continued)

OTHER PUBLICATIONS

Office Action dated Apr. 16, 2013 issued in corresponding JP application No. 2012-015640 (English translation).

(Continued)

*Primary Examiner* — Andre Allen
(74) *Attorney, Agent, or Firm* — Posz Law Group, PLC

(57) ABSTRACT

A pressure sensor is disclosed. The pressure sensor comprises a sensor chip having a depressed portion and a diaphragm defining a bottom of the depressed portion, a support member defining a pressure transmission passage communicating with the depressed portion, and a gel member continuously filling the depressed portion and at least a part of the pressure transmission passage. The sensor chip is bonded to a mounting surface of the support member with an adhesive. An edge of an open end of the pressure transmission passage on the mounting surface faces an surrounding region of the depressed portion of the sensor chip.

9 Claims, 6 Drawing Sheets

(56) References Cited

FOREIGN PATENT DOCUMENTS

| | | | |
|---|---|---|---|
| JP | 2006-220456 | A | 8/2006 |
| JP | 2006220592 | A | 8/2006 |
| JP | A-2010-122037 | | 6/2010 |
| JP | A-2010-249524 | | 11/2010 |

OTHER PUBLICATIONS

Office Action mailed Aug. 20, 2013 in the corresponding JP application No. 2012-015640 (English translation).

Office Action dated Jan. 22, 2014 issued in corresponding CN patent application No. 2012100807647 (and English translation).

* cited by examiner

PRESSURE SENSOR

CROSS REFERENCE TO RELATED APPLICATION

The present application is based on and claims priority to Japanese Patent Applications No. 2011-64736 filed on Mar. 23, 2011 and No. 2012-15640 filed on Jan. 27, 2012, disclosures of which are incorporated herein by reference.

TECHNICAL FIELD

The present disclosure relates to a pressure sensor in which a diaphragm of a sensor chip is deformed in response to the pressure transmitted through a gel member.

BACKGROUND

As described in Patent Document 1, a known pressure sensor includes a sensor chip having a depressed portion and a diaphragm equipped with a gauge resistor, a support member defining a pressure transmission passage communicating with the depressed portion, and a gel member integrally filling the depressed portion and the pressure transmission passage. In the pressure sensor, the diaphragm is deformed according to pressure transmitted through the gel member.

This kind of pressure sensor may be used to measure a difference in pressure before and after an exhaust gas purification filer (e.g., diesel particulate filter abbreviated as DPF) installed in an exhaust pipe of a diesel engine vehicle. Alternatively, the pressure sensor may be used in an exhaust gas recirculation (EGR) system to measure pressure. In order to protect the pressure sensor against a corrosive pressure medium such as liquid and gas, the pressure sensor is provided with the gel member. In such a pressure sensor, if water enters the depressed portion of the sensor chip, the freezing and volume expansion of the water at lower temperatures may damage the diaphragm. Because of this, the gel member is provided to prevent the water from entering the depressed portion through the pressure transmission passage of the support member.

Patent Document 1: JP-2007-3449A (US 2006/0288793A)

In the pressure sensor, the support member (e.g., stem) made of glass may be bonded to the sensor chip by anodic bonding. In general, the anodic bonding is performed under a condition that the stem is grounded to have a low electric potential and the sensor chip has a high electric potential. In this case, when the sensor chip has a shoulder portion that projects radially inwardly than the pressure transmission passage, the shoulder portion acts as a lightning rod at the anodic bonding, and as a result, a current flows from the shoulder portion. That is, a spark occurs. This reduces a bonding strength and makes a stable anodic bonding difficult. In the above, the sensor chip has the shoulder portion when the open end of the depressed portion of the sensor chip on a support member side is smaller than an open end of the pressure transmission passage of the support member on a sensor chip side.

Patent Document 1 illustrates a pressure sensor in which a diameter of an open end of the pressure transmission passage of the stem on a sensor chip side is smaller than the diameter of the open end of the depressed portion of the sensor chip. The stem has a shoulder portion that radially inwardly projects than the outer edge of the depressed portion of the sensor chip. When the stem has the shoulder portion, the spark may be prevented from occurring.

At low temperatures of, for example, −30 degrees C. or less, the gel member used in the pressure sensor hardens and moves (flows) to relax a resultant stress. As a result, a resistance of the gauge resistor of the diaphragm changes and a sensor output property changes. At high temperatures, the gel member may expand and the sensor output property may accordingly change. When the pressure sensor is placed in an exhaust gas environment and exposed to an acid component of the exhaust gas such as nitric acid and the like for a long period of time, a surface layer of the gel member is hardened. When the surface layer of the gel member is hardened, the sensor output changes to a large extent. In particular, at high temperatures, the sensor output changes to a large extent due to the hardening of the gel member.

As described above, the stem may have the shoulder portion. In this case, when the gel member moves from the depressed portion toward the stem, a viscous resistance of the gel member against the stem is large. This viscous resistance inhibits the gel member from moving toward the stem. When the gel member moves from the stem toward the depressed portion, a viscous resistance is small. Thus, when the stem has the shoulder portion, the gel member can more easily move from the stem to the depressed portion than when the sensor chip has the shoulder portion. The stress may acts on the diaphragm.

SUMMARY

In view of foregoing, it is an object of the present disclosure to provide a pressure sensor that can avoid a bonding strength reduction caused by a spark, and can efficiently prevent a stress due to deformation of a gel member from acting on a diaphragm.

According to an example of the present disclosure, a pressure sensor comprises a sensor chip, a support member, and a gel member. The sensor chip has a depressed portion, a diaphragm, and a gauge resistor. The depressed portion has an open end on one surface of the sensor chip. The diaphragm defines a bottom of the depressed portion. The gauge resistor is formed on the diaphragm. The support member has a mounting surface facing the one surface of the sensor chip. The mounting surface is a surface to which sensor chip is fixed. The support member defines a pressure transmission passage that has an open end on the mounting surface, and that communicates with the depressed portion. The gel member continuously fills the depressed portion and at least a part of the pressure transmission passage, and protects the diaphragm. In response to transmission of pressure of a pressure medium to the diaphragm through the gel member and deformation of the diaphragm, resistance of the gauge resistor changes. An edge of the open end of the pressure transmission passage on the mounting surface of the support member faces an surrounding region of the open end of the depressed portion on the one surface of the sensor chip. The at least part of the pressure transmission passage, which is in contact with the gel member, has minimum cross sectional area at the open end on the mounting surface and maximum cross sectional area at a place farthest from the diaphragm. The cross sectional area of the at least part of the pressure transmission passage at a given place is greater than or equal to that between the diaphragm and the given place. The support member includes a first support part having the mounting surface. The first support part further has a rear surface opposite to the mounting surface and defines a first pressure transmission passage part penetrating from the mounting surface to the rear surface. The sensor chip is bonded to the mounting surface of the first support part with an adhesive. The first pressure transmission passage part is included in the pressure transmission passage. The cross sectional area of the first pressure transmission passage part at a first location is larger than the cross sectional area of the first pressure transmission passage part at a second location. The first location is the open end of the first pressure transmission passage part on the mounting surface. The second location is a location farthest from the diaphragm among a portion of the first pressure transmission passage part contacting with the gel member. The first support part is a part to which the sensor chip is fixed via only the adhesive.

According to the above, the pressure sensor can avoid a bonding strength reduction caused by a spark, and can efficiently prevent a stress due to deformation of a gel member from acting on the diaphragm.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments will be described with reference to the accompanying drawings. In the following, like references are used to refer to like parts. For simplification of drawings, an adhesive layer for bonding a stem and a case to each other is omitted from FIGS. 4A and 4B. In addition, for simplification of drawings, the case is omitted from FIGS. 2, 3, and 8 to 10.

First Embodiment

A pressure sensor 10 of the present embodiment can be used to measure pressure of, for example, a corrosive pressure medium such as corrosive liquid or gas. Specifically, the pressure sensor 10 may be used to measure the pressure of an exhaust gas in an exhaust pipe of a diesel engine vehicle. Alternatively, the pressure sensor 10 may be used to measure a difference in pressure before and after an exhaust gas purification filer (e.g., diesel particulate filter) in the exhaust pipe. Alternatively, the pressure sensor 10 may be used to measure pressure in an exhaust gas recirculation (EGR) system.

Figure 1:
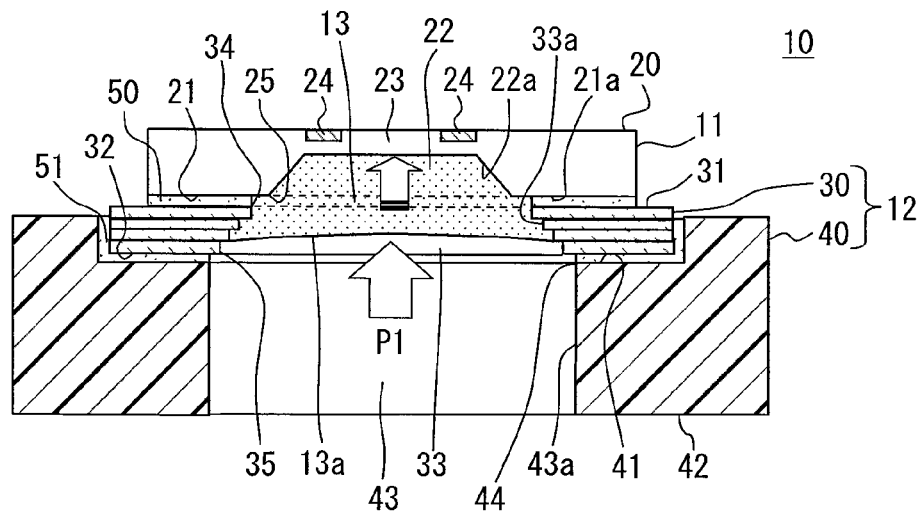
FIG. 1 is a cross sectional view of a pressure sensor of a first embodiment.

As shown in FIG. 1, the pressure sensor 10 includes a sensor chip 11, a support member 12, a gel member 13, and an adhesive layer 50. The sensor chip 11 has a depressed portion 22. The support member 12 supports the sensor chip 11 and defines a through-hole 33, 43 serving as a pressure transmission passage. The depressed portion 22 and at least a part of the through-hole 33, 43 are filled with the gel member 13. The support member 12 includes at least a stem 30 serving as a first support part. In the present embodiment, the support member 12 further includes a case 40 serving as a second support part. The adhesive layer 50 can correspond to an adhesive.

The sensor chip 11 includes a semiconductor substrate or the like. The sensor chip 11 has a front surface 20 and a rear surface 21. The depressed portion 22 of the sensor chip 11 opens on the rear surface 21. The rear surface 21 can correspond to one surface of the sensor chip 11. The depressed portion 22 is formed by etching the rear surface 21 of the sensor chip 11. A portion of the sensor chip 11 defines a bottom of the sensor chip 11 and serves as a diaphragm 23. Specifically, the sensor chip 11 has a thin portion on a front surface 20 side. The thin portion, which corresponds to the depressed portion 22, is the diaphragm 23.

In the present embodiment, a silicon substrate is used as the semiconductor substrate, etching speed of which differs depending on crystal planes. The depressed portion 22 is formed with use of this etching speed difference. Specifically, the semiconductor substrate having a (100) plane as the rear surface 21 is prepared. Anisotropic wet etching is performed with use of an etching liquid such as KOH etchant and the like. As a result, the depressed portion 22 is formed, so that a side surface and a bottom surface of an inner wall 22a of the depressed portion 22 become a (111) plane and a (100) plane, respectively. This side surface of the inner wall 22a has an angle of 54.7 degrees with respect to the rear surface 21, which is (100) plane. Thus, opening area (also called "cross sectional area") of the depressed portion 22 varies depending on depth of the depressed portion 22. Specifically, the opening area of the depressed portion 22 increases as the distance from the diaphragm 23 increases. More specially, the depressed portion 22 has such a taper shape that a rate of change in the opening area of the depressed portion 22 is constant over the depth direction The rear surface 21 of the sensor chip 11 opposite to the front surface 20 is a region surrounding the depressed portion 22. The reference 25 shown in FIG. 1 denotes an edge of the open end of the depressed portion 22. The edge of the open end of the depressed portion 22 is also an inner edge of the surrounding region 21a of the depressed portion 22. The edge denoted by the reference 25 is called herein "a second inner edge 25". The surrounding region 21a of the depressed portion on the rear surface 21 refers to a region of the rear surface 21 except for the inner wall 22a of the depressed portion 22. The depressed portion 22 opens on the rear surface 21 of the sensor chip 11. Since the rear surface 21 of the present embodiment excludes the inner wall of the depressed portion 22, the rear surface 21 is substantially equivalent to the surrounding region 21a of the rear surface 21.

A gauge resistor 24 is formed on the front surface 20 of the sensor chip 11, so that the gauge resistor 24 is located on the diaphragm 23. The gauge resistor 24 may be formed by, for example, impurity diffusion. In the present embodiment, in order to improve sensitivity, the gauge resistor 24 is formed on a portion of the diaphragm 23 that can have a large strain. For example, the gauge resistor 24 is formed on an end portion of the diaphragm 23. The gauge resistor 24 may include four gauge resistor elements forming a bridge circuit (not shown).

As described above, the sensor chip 11 of the present embodiment is configured as a semiconductor sensor chip, which uses a gauge resistance effect to output a signal corresponding to the applied pressure. Specifically, when the pressure of the pressure medium is transmitted to the gel member 13 through the through-hole 33, 43 and then transmitted to the diaphragm 23 through the gel member 13, the diaphragm 23 is strained (deformed) by the pressure 3, and a resultant piezoresistive effect changes the resistance of the gauge resistor 24. Accordingly, the bridge circuit of the gauge resistor 24 outputs a signal corresponding to the strain of the diaphragm 23. Specifically, level of the outputted signal corresponds to magnitude of the applied pressure.

The sensor chip 11 is mounted to the sensor chip mounting surface 31 (abbreviated as a mounting surface) of the stem 30 with at least a portion of the rear surface 21 of the sensor chip 11 serving as a portion for fixing. The adhesive layer 50 is arranged to surround the depressed portion 22 and fixes the sensor chip 11 to the stem 30. In the present embodiment, an adhesive film is used as the adhesive layer 50. When the adhesive layer 50 has a film shape from the beginning, it is possible to prevent the adhesive from flowing into the depressed portion 22 and from sticking to the diaphragm 23. Note that when an adhesive in liquid form is hardened by heating or lighting to form the adhesive layer 50, the adhesive may flow into the depressed portion 22 and stick to the diaphragm 23. Furthermore, the adhesive layer 50 having a film shape at the beginning can ensure a predetermined thickness of the adhesive layer 50.

The stem 30 may be also a part called a pedestal. The stem 30 has the sensor chip mounting surface 31 and defines the through-hole 33 opening on the sensor chip mounting surface 31. The sensor chip mounting surface 31 faces the rear surface 21 of the sensor chip 11. The through-hole 33 can correspond to a first presser transmission part. The through-hole 33 penetrates from the sensor chip mounting surface 31 to the rear surface 32, and communicates with the depressed portion 22 of the sensor chip 11 fixed to the stem 30, It may be preferable that coefficient of thermal expansion of a material of the stem 30 be similar to that of the substrate of the sensor chip 11. Furthermore, depending on applications, it may be preferable that the material of the stem 30 have heat resistance. For example, the material of the stem 30 may be ceramic such as alumina $Al_2O_3$ and the like, metal such as 42-alloy and Cu, or glass. In the present embodiment, a ceramic multilayer board formed by stacking four ceramic boards is used as the stem 30.

The sensor chip mounting surface 31 of the stem 30 has an inner edge (also called "first inner edge 34") that surrounds the open end of the through-hole 33. The first inner edge 34 faces the rear surface 21. The first inner edge 34 can correspond to an edge 34 of the open end of the pressure transmission passage 33, 43 on the mounting surface 31. A positional relationship between the first inner edge 34 of the stem and the rear surface 21 of the sensor chip 11 may be such that the first inner edge 34 of the stem 30 and the second inner edge 25 of the depressed portion 22 of the sensor chip 11 coincide with each other in a direction parallel to the sensor chip mounting surface 31. Alternatively, the first inner edge 34 of the stem 30 is located on an outside of the second inner edge 25 of the sensor chip 11 in the direction parallel to the sensor chip mounting surface 31. The size of the open end of the through-hole 33 on the sensor chip mounting surface 31 may equal to or larger than that of the open end of the depressed portion 22. When the size of the open end of the through-hole 33 on the sensor chip mounting surface 31 is larger than that of the open end of the depressed portion 22, the open end of the through-hole 33 on the sensor chip mounting surface 31 may surround the open end of the depressed portion 22.

A portion of the through-hole 33 contacts with the gel member 13 and has minimum opening area at the open end on the sensor chip mounting surface 31. That is, the opening area (also called "cross-sectional area") of the portion of the through-hole 33 contacting with the gel member 13 is minimum at the first inner edge 34. The opening area of the portion of the through-hole 33 contacting with the gel member 13 at a place farthest from the diaphragm 23 is larger than that at the first inner edge 34. Furthermore, the opening area at a given place is greater than or equal to that between the given place and the diaphragm 23.

In the present embodiment, an entire perimeter of the first inner edge 34 is located radially outwardly than the second inner edge 25. A portion of an inner wall 33a of the through-hole 33 contacting with the gel member 13 has a stepwise shape. Because of this, the through-hole 33 has multiple opening areas. In the present embodiment, each layer of the ceramic multilayer board defines a through-hole. Respective layers of the multilayer board have different opening areas such that the layer closer to the case 40 has a larger opening area. In this way, the inner wall 33a is formed into a stepwise shape.

An inner peripheral surface of the adhesive layer 50 is flush with the inner wall of a top layer of the ceramic multilayer board, which is a layer closest to the sensor chip 11 among multiple layers of the ceramic multilayer board. The adhesive layer 50 is in contact with a portion of the rear surface 21 of the sensor chip 11, the portion ranging from the second inner edge 25 except for some regions of the rear surface 21. The second inner edge 25 of the sensor chip 11 is located radially inwardly than the inner wall 33a of the stem 30 and the inner peripheral surface of the adhesive layer 50. The rear surface 21 (region 21a) of the sensor chip 11 is in part exposed to the stem 30 and the adhesive layer 50.

The stem 30 is mounted to a stem mounting surface 41 of the case 40, so that the rear surface 32 of the stem 30 faces the case 40. The stem 30 is fixed to the case 40 with an adhesive layer 51. Specifically, the adhesive layer 50, the stem 30 and the adhesive layer 51 are disposed between the case 40 and the sensor chip 11.

The case 40 can function as an attachment part for attaching the pressure sensor 10 to an exhaust system of a vehicle. The case 40 defines the through-hole 43 acting as a second pressure transmission passage part. The through-hole 43 penetrates from the stem mounting surface 41 to a rear surface 42 opposite to the stem mounting surface 41. The through-hole 43 communicates with the through-hole 33 of the stem 30 bonded and fixed to the case 40. The case 40 includes a terminal for external connection (not shown).

The stem mounting surface 41 of the case 40 has an edge of an open end of the through-hole 43, which is referred to herein as a third inner edge 44. The rear surface 32 of the stem 30 has an edge of an on open end of the through-hole 33, which is referred to herein as a fourth inner edge 35. The third inner edge 44 is located radially outwardly than the fourth inner edge 35 in the direction parallel to the sensor chip mounting surface 31. The through-hole 43 has a straight shape, so that opening area (cross sectional area) of the through-hole 43 is constant over a reference direction, which is a direction perpendicular to the sensor chip mounting surface 31 (and the stem mounting surface 41). The reference direction is also called herein a perpendicular direction. The opening area of the through-hole 43 is larger than that of the through-hole 33.

The case 40 may be made of resin such as Polyphenylene Sulfide (PPS), Polybutylene terephthalate (PBT) or the like. The case 40 may be provided with a terminal formed by insert molding. The terminal of the case 40 and the sensor chip may be electrically connected with each other by wire bonding.

As described above, in the pressure sensor 10, the support member 12 is constructed by integrating the stem 30 and the case 40 through the adhesive layer 51. The sensor chip 11 is bonded and fixed to the sensor chip mounting surface 31 of the stem 30 of the support member 12. The through-hole 33 of the stem 30 and the through-hole 43 of the case 40 communicate with each other, thereby forming a pressure transmission passage of the support member 12. In the present embodiment, the gel member 13 fills the depressed portion 22 and the through-hole 33. The gel member 13 in the depressed portion 22 is continuous with that in the through-hole 33. Specifically, an inner wall 43a of the through-hole 43 of the case 40 is not in contact with the gel member 13. The gel member 13 integrally fills the depressed portion 22 and the through-hole 33. In other words, the gel member 13 integrally fills a part of the pressure transmission passage 33, 43.

The part of the pressure transmission passage 33, 43 contacting with the gel member 13 has minimum opening area (also called "minimum cross sectional area") at the first inner edge of the stem 30, and has maximum opening area (also called "maximum cross sectional area") at a place farthest from the diaphragm 23. Specifically, in the example shown in FIG. 1, the place farthest from the diaphragm 23 is the third layer of the ceramic substrate from the sensor chip mounting surface 31 (sensor chip side layer). Furthermore, the opening area of the part of the pressure transmission passage 33, 43 at a given place is greater than or equal to that at a place that is closer to the diaphragm 23 than the give place is.

In the present embodiment, the opening area of the pressure transmission passage 33 is minimum at the first inner edge 34 of the stem 30 and maximum at the inner wall 43a of the through-hole 43. Specifically, there is an opening area relationship expressed as "second inner edge 25>first inner edge 34>fourth inner edge 35>third inner edge 44". Additionally, the opening area at a given place is greater than or equal to that between the diaphragm 23 and the give place.

The gel member 13 is provided to protect the adhesive layer 50 and in particular the diaphragm 23 of the sensor chip 11. The bottom of the depressed portion 22, which corresponds to the diaphragm 23, is covered with the gel member 13. The pressure sensor 10 of the present embodiment is usable to detect the pressure of a corrosive pressure medium such as the exhaust gas pressure of a diesel engine. The gel member 13 protects the adhesive layer 50 and in particular the diaphragm 23 of the sensor chip 11 (the bottom of the depressed portion 22) against the corrosive pressure medium.

A material of the gel member 13 may be silicon gel, fluorinated gel, fluoro-silicone gel and the like. The gel member 13 is filled by injecting this kind of gel material into the depressed portion 22 and the through-hole 33 and thereafter hardening the gel material.

The gel member 13 integrally fills all region of the depressed portion 22 of the sensor chip 11 and at least a part of the pressure transmission passage 33, 43 of the support member 12. The part of the pressure transmission passage of the support member 12 is a part of the through-holes 33, 43 on a depressed portion side (the part around the sensor chip mounting surface 31). In an example of the present embodiment, as described above, the gel member 13 continuously fills a region ranging from the depressed portion 22 to a halfway of the through-hole 33.

In the pressure sensor 10, when the pressure P1 of the pressure medium serving as a detection target is applied to a surface 13a (also called "pressure receiving surface") of the gel member 13 through the through-hole 43 of the case 40, the pressure is transmitted to the diaphragm 23 of the sensor chip 11 through the gel member 13 in the through-hole 33 and the depressed portion 22. The surface 13a is exposed toward the through-hole 43.

In the present embodiment, at the room temperature, the surface 13a of the gel member 13 has a meniscus shape. Specifically, the surface 13a of the gel member 13 is convex toward the diaphragm 23, in other words, is concave in a direction away from the diaphragm 23.

Advantages of the pressure sensor 10 of the present embodiment will be described.

The first inner edge 34 of the sensor chip mounting surface 31 of the stem 30 does not face the depressed portion 22 of the sensor chip 11 but faces the rear surface 21 of the sensor chip. Specifically, the first inner edge 34 faces the region 21a. In other words, in a direction parallel to the sensor chip mounting surface 31, the stem 30 does not have the shoulder portion that projects radially inwardly than the depressed portion 22.

A reason for the absence of the shoulder portion of the stem 30 is that the sensor chip 11 is fixed to the stem 30 by not the anodic bonding but the adhesive layer 50. It should be noted that if the sensor chip 11 includes a shoulder portion projecting radially inwardly than the through-hole 33 at the time of anodic bonding, the shoulder portion acts like a lighting rod and an electric current flows from the shoulder portion, and as a result, the spark occurs at the time of anodic bonding. Because of this, in the case of anodic bonding, the stem 30 needs to have the shoulder portion.

A viscous resistance is proportional to a coefficient of viscosity specific to each material and depends on shape of an object contacting with a viscous object.

Specifically, a concave or convex shape can have a larger contacting area with the viscous object and causes a larger viscous resistance than a plane surface.

The gel member 13, which is a viscous object, becomes stiff and deforms at low temperatures (e.g., −30 degrees c. or less). In order to relax this deformation, the gel member 13 moves (flows).

Figure 2:
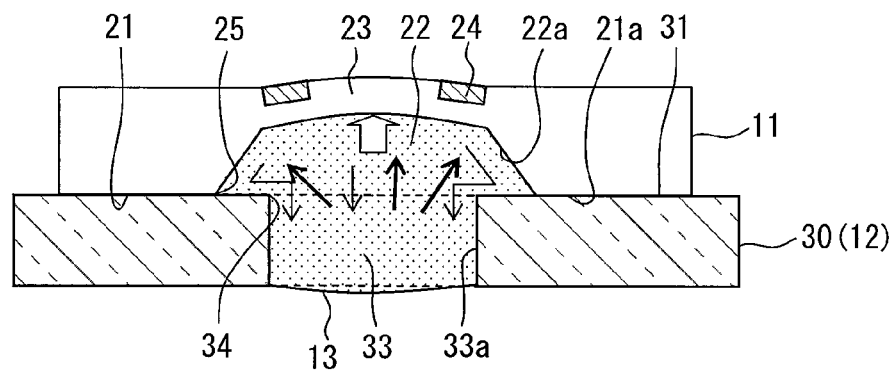
FIG. 2 is a cross sectional view illustrating a pressure sensor of a comparison example in which a gel member is in a deformed state.

FIG. 2 illustrates a pressure sensor 10 of a comparison example, in which the stem 30 includes a shoulder portion which projects radially inwardly than the depressed portion 22. In other words, the first inner edge 34 of the sensor chip mounting surface 31 of the stem 30 is located on an inside of the second inner edge 25 of the rear surface 21 of the sensor chip 11 and faces the depressed portion 22 of the sensor chip 11. Thus, when the gel member 13 moves from the depressed portion 22 in a direction away from the diaphragm 23, the viscous resistance of the gel member 13 against the stem 30 is large. This inhibits the gel member 13 from moving in the direction away from the diaphragm 23. When the gel member 13 moves from the through-hole 33 toward the depressed portion 22, the viscous resistance is smaller than when the gel member 13 moves from the depressed portion in the direction away from the diaphragm 23. This is because the shoulder portion is present in the stem 30. Thus, the gel member 13 presses the diaphragm 23 as shown by an open arrow in FIG. 2, and as a result, the diaphragm 23 is subjected to stress and strain and is bent in a direction away from the stem 30. A similar situation happens when the gel member 13 expands at high temperatures.

Figure 3:
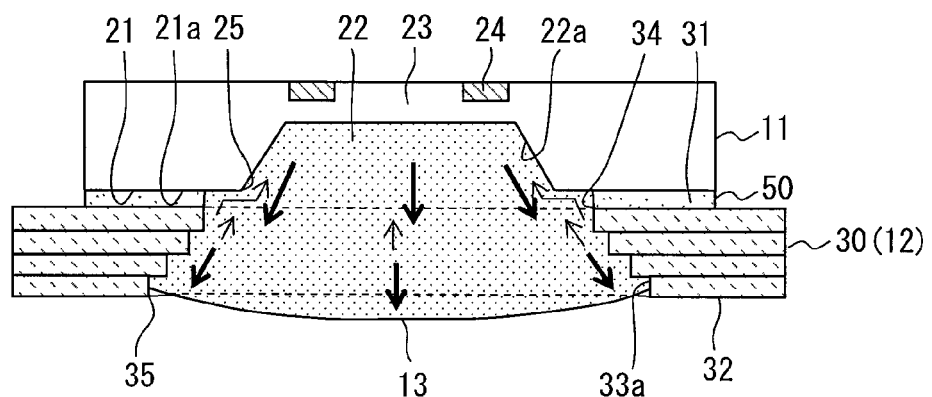
FIG. 3 is a cross sectional view illustrating a deformed state of a gel member of the pressure sensor illustrated in FIG. 1.

By contrast, in the present embodiment, as shown in FIG. 3, the stem 30 does not have the shoulder portion that radially inwardly projects than the depressed portion 22. Because of this, the viscous resistance due to the shoulder portion is absent. This facilitates movement of the gel member 13 in the direction from the depressed portion 22 to the stem 30, specifically, in the direction away from the diaphragm 23. When the gel member 13 moves from the through-hole 33 toward the depressed portion 22, the viscous resistance is larger than when the gel member 13 moves from the depressed portion 22 in the direction away from the diaphragm 23. Thus, the gel member 13 can more easily move in the direction away from the diaphragm 23, as compared with the comparison example shown in FIG. 2. This Because of this, the stress of the gel member 13 is relaxed by the movement of the gel member 13 in the direction away from the diaphragm 23. Therefore, the stress due to the deformation of the gel member 13 can be efficiently prevented from acting on the diaphragm and the gauge resistor 24.

Figure 4A:
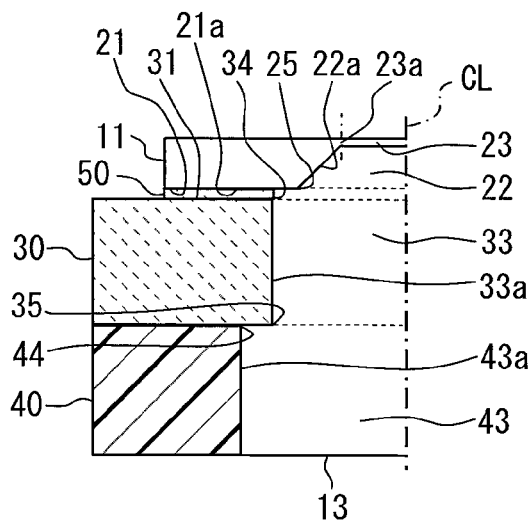
FIG. 4A is a diagram illustrating a first sample used in a stress analysis, the first sample being a pressure sensor in which a sensor chip has a shoulder portion as is the case in FIG. 1.
Figure 4B:
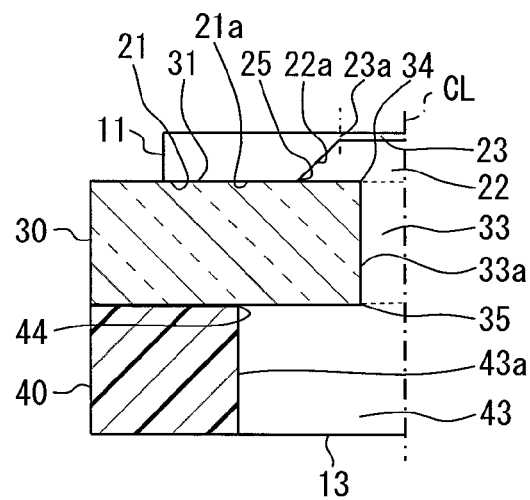
FIG. 4B is a diagram illustrating a second sample used in the stress analysis, the second sample being a pressure sensor in which a stem a sensor chip has a shoulder portion as is the case in the comparison example in FIG. 2.

The inventor of the present application has performed a finite-element-method-based analysis (FEM analysis) to confirm the above-described advantages. FIGS. 4a and 4b schematically illustrate structures of the pressure sensors used in the FEM analysis. Specifically, FIG. 4A illustrates a first sample, in which the sensor chip 11 has the shoulder portion as is the case of the pressure sensor 10 in the present embodiment. FIG. 4B illustrates a second sample, in which the stem 30 has the shoulder portion as is the case in the comparison example.

In the first sample, a silicon substrate is used for the sensor chip 11, fluoro-silicone is used for the adhesive layer 50, alumina is used for the stem 30, PBT is used for the case 40, and fluorine gel with Young's modulus of 0.1 MPa is used for the gel member 13. Additionally, the opening area (cross sectional area) of the stem 30 is constant. The distance from the first inner edge 34 to the second inner edge 25 in the direction parallel to the sensor chip mounting surface 31 is 0.375 mm. Additionally, the inner wall 33a of the stem 30 is flush with the inner peripheral surface of the adhesive layer 50.

In the second sample shown in FIG. 4B, a silicon substrate is used for the sensor chip 11, glass is used for the stem 30, PBT is used for the case 40, and fluorine gel with Young's modulus of 0.1 MPa, is used for the gel member 13. Additionally, the distance from the first inner edge 34 to the second inner edge 25 in the direction parallel to the sensor chip mounting surface 31 is 0.7 mm. The opening area of the stem 30 is constant.

A structure of the sensor chip 11 (such as size and thickness of the diaphragm 23, thickness of the sensor chip 11, and size and shape of the depressed portion 22) and a structure of the case 40 (such as opening area and length of the through-hole 43) are the same between the first sample and the second sample. A stress generated in the diaphragm 23 when the temperature is changed from the high temperature of 150 degrees C. to the low temperature of −40 degrees C. is analyzed by structural analysis. In this analysis, a portion of the diaphragm from an end 23a (denoted by two-dotted dashed line in FIG. 4) of the diaphragm 23 to the center CL of the diaphragm 23 is divided at regular intervals. Obtained fifteen points 1 to 15 are set as stress measurement points. The first point 1 is set to the end 23a.

Figure 5:
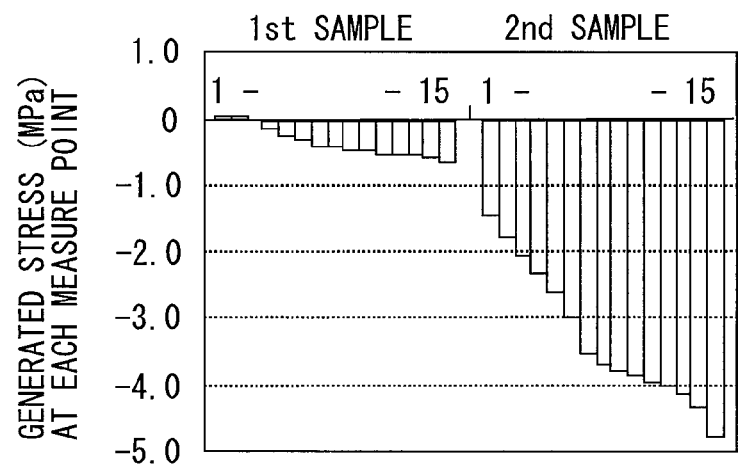
FIG. 5 is a graph illustrating results of the stress analysis of the first sample and the second sample.

Results of the analysis are shown in FIG. 5. FIG. 5 clearly shows that the stress generated in the diaphragm 23 in the first sample is smaller than that in the second sample. The largest generated stress among the measurement points 1 to 15 is −0.5 MPa in the first sample 1 and −4.8 MPa in the second sample. The largest generated stress of the first sample is smaller than that of the second sample by 90%. This result clearly shows that the structure of the present embodiment can efficiently suppress the application of the stress, which results from the deformation of the gel member 13, to the diaphragm 23 and the gauge resistor 24.

In the present embodiment, the part of the pressure transmission passage 33, 43 contacting with the gel member 13 has the minimum opening area at the first inner edge 34 of the stem 30. The opening area at places distant from the sensor chip mounting surface 31 in the direction away from the diaphragm 23 is not narrow than the opening area at the edge of the sensor chip mounting surface 31. Additionally, the contacting part of the pressure transmission passage 33, 43 has the maximum opening area at the place farthest from the diaphragm 23. This maximum opening area is larger than the opening area at the first inner edge 34. Furthermore, the opening area at a given place is greater than or equal to that between the given place and the diaphragm 23. Because of these, when the gel member 13 becomes stiff and deformed at the low temperature, the gel member 13 can relax its stress due to this deformation by moving in the through-hole 33 of the stem 30 in the direction away from the diaphragm 23. Accordingly, the stress acting on the diaphragm 23 can be efficiently suppressed. The same can apply to the case where the gel member 13 expands at the high temperature.

In the present embodiment, the sensor chip 1 is fixed to the stem 30, which serves as a first support part, through the adhesive layer 50. Specifically, the first support part includes only the stem 30, which is a part fixed to the sensor chip 11 through only the adhesive layer 50. Additionally, a portion of the through-hole 33 of the stem 30 contacts with the gel member 13. The opening area of the contacting portion at the place farthest from the diaphragm 23 is larger than that at the first inner edge 34. As described above, the opening area at a given place is greater than or equal to that between the given place and the diaphragm 23. Because of these, as shown in FIG. 3, the gel member 13 can more easily move in the stem 30 in the direction away from the diaphragm 23 than in the direction toward the diaphragm 23. In the present embodiment, the gel member 13 can move more easily, as compared with a case where the opening area of the through-hole 33 is constant. Therefore, the stress acting on the diaphragm 23 can be efficiently suppressed. It should be noted that the part contacting with the gel member 13 refers to not a part filled with the gel member 13 at the time of manufacture. The part contacting with the gel member 13 refers to a maximum contactable part that can contact with the gel member 13 in a service temperature range. Specifically, the part contacting with the gel member 13 refers to a part that contacts with the gel member 13 at an upper limit of the service temperature range.

Because of the synergy of the above advantages, the pressure sensor 10 of the present embodiment can efficiently prevent the stress, which results from the deformation of the gel member 13, from acting on the diaphragm 23 and the gauge resistor 24.

In particular, when a pressure sensor like the pressure sensor 10 of the present embodiment is exposed to exhaust gas, the pressure sensor is exposed an acid component of the exhaust gas such as nitric acid or the like for a long period of time. In this case, a surface layer of the gel member 13 is hardened. When the surface layer of the gel member 13 becomes hardened, it typically becomes difficult for the gel member 13 to move in the direction away from the diaphragm 23, and accordingly, a force for pushing up the diaphragm typically becomes larger, as compared with a case where the surface layer is not hardened. Nevertheless, in the pressure sensor 10 of the present embodiment, the gel member 13 can easily move in the direction away from the diaphragm 23. Therefore, even if the surface layer of the gel member 13 becomes hardened due to the acid component, the hardened surface layer is subjected to a larger force for deforming the gel member 13 in the direction away from the diaphragm 23, as compared with the comparison example. Because of this, a deformation amount of the hardened surface portion of the gel member 13 is large, and as a result, the present embodiment can efficiently prevent the stress, which results from the deformation of the gel member 13, from acting on the diaphragm 23 and the gauge resistor 24, as compared with the comparison example.

Figure 6:
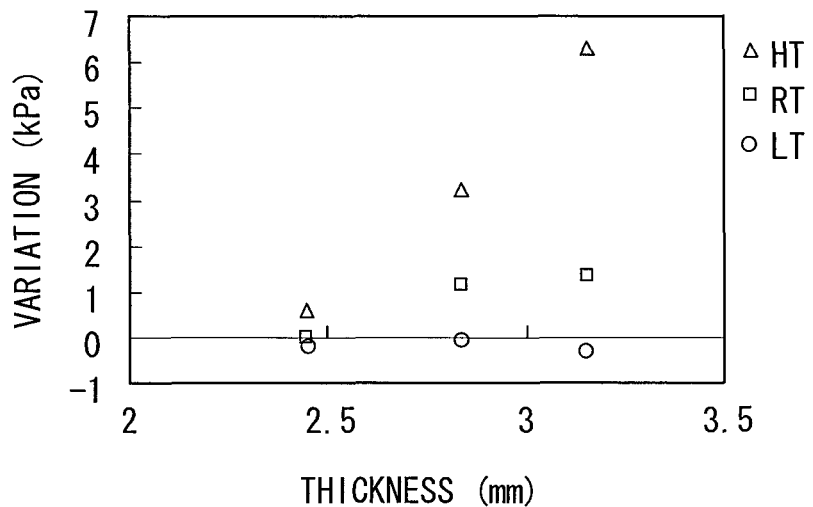
FIG. 6 is a graph illustrating a relationship between thickness of a gel member and vibration amount of stress acting on a diaphragm.
Figure 7:
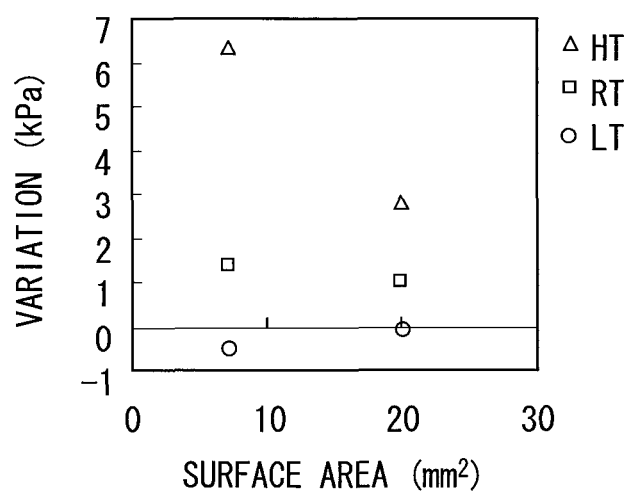
FIG. 7 is a graph illustrating a relationship between surface area of a gel member and variation amount of stress acting on a diaphragm.

The inventor of the present application has performed experiments to study how each of thickness and surface area of the gel member 13 affects an amount of acid-component-causing-variation of the stress generated in the diaphragm 23. Results of the experiments are shown in FIGS. 6 and 7. In the experiments, pairs of pressure sensors 10, each pair having the same structure, were prepared. In each pair, one pressure sensor 10 was heated at 140 degrees C., and for 160 hours, exhaust condensed liquid with PH of 1.5 was dropped on the surface 13a of the gel member 13 once per predetermined time. The predetermined time is between 20 minutes and 30 minutes. In this way, a sample in which the surface layer of the gel member 13 was hardened was obtained. Thereafter, this obtained sample and the other sample, in which the exhaust condensed liquid was not dropped, were paired again. For each sample in the pair, the maximum generated stress of the diaphragm 23 at three temperature levels was measured. The three temperature levels are a high temperature (HT) of 150 degrees C., a room temperature (RT) of 20 degrees C. and a low temperature (LT) of −40 degrees C. At each temperature level, the difference in maximum generated stress between the pair of samples is measured as a variation amount. In FIGS. 6 and 7, an open triangle, an open rectangular, and an open circle denote the variation amounts at the high temperature, the room temperature, and the low temperature, respectively.

The gel members 13 having three thickness levels of approximately 2.5 mm, approximately 2.8 mm and approximately 3.2 mm were prepared. The silicon substrate was used for the sensor chip 11, fluoro-silicone was used for the adhesive layer 50, the alumina was used for the stem 30, PBT was used for the case 40, and fluorine gel with Young's modulus of 0.1 MPa was used for the gel member 13. Parameters except the thickness of the gel member 13 were the same. FIG. 6 shows that the variation is large at the high temperature, and that the variation is larger as the thickness of the gel member 13 is larger. A reason why the thicker gel member 13 causes the larger variation at the high temperature is that the thicker gel member 13 has a larger expansion force and accordingly has a large force for pushing up the diaphragm 23.

As for the surface area of the gel member 13, the gel members 13 having two surface area levels of 9 mm$^2$ and 20 mm$^2$ were prepared. The silicon substrate was used for the sensor chip 11, fluoro-silicone was used for the adhesive layer 50, the alumina was used for the stem 30, PBT was used for the case 40, fluorine gel with Young's modulus of 0.1 MPa was used for the gel member 13. Parameters except the surface area of the gel member 13 were the same. FIG. 7 shows that the variation at the high temperature is large. In particular, the variation is larger as the surface area of the gel member 13 is smaller. A reason why the smaller surface area of the gel member 13 causes the larger variation at the high temperature is that the smaller surface area, i.e., the smaller opening area, causes a stronger spring property of the hardened surface layer of the gel member 13 and makes the hardened surface layer difficult to deform. Because of this, the force for pushing up the diaphragm 23 was increased.

The above results indicate that a large surface area and a small thickness of the gel member 13 may be preferable in order to reduce the stress, which acts on the diaphragm in a state where the surface layer of the gel member 13 is hardened due to the acid component. As for the thickness of the gel member 13, since the gel member 13 protects the adhesive layer 50 as well as the diaphragm 23, a minimum required thickness from the inner edge may be a thickness that allows protecting the adhesive layer 50. For example, the minimum required thickness from the first inner edge 34 may be 1 mm or more.

The above results are reflected in the present embodiment in such way that in order to reduce the thickness of the gel member 13, the gel member 13 fills the through-hole 33 of the stem 30 and does not fill beyond the through-hole 33 although the support member 12 includes the case 40. Thus, the stress acting on the diaphragm 23, in particular the stress when the surface portion of the gel member 13 is hardened due to the acid component, can be reduced as compared with a case where the through-hole 43 of the case 40 is filled with the gel member 13. Moreover, in the present embodiment, the part of the pressure transmission passage 33, 43 contacting with the gel member 13 has a certain cross section size (e.g., diameter) at the place farthest from the diaphragm 23. This certain cross section size is larger than the thickness of the gel member 13. The thickness of the gel member 13 is defined as a maximum length of the gel member 13 in the reference direction (also called "perpendicular direction"), which is perpendicular to the sensor chip mounting surface 31. Therefore, the stress acting on the diaphragm 23, in particular the stress when the surface layer of the gel member 13 is hardened due to the acid component, can be reduced as compared with a case where the thickness of the gel member 13 is greater than or equal to the above-described certain cross section size. Furthermore, the present embodiment uses the ceramic multilayer board as the stem 30. This facilitates the formation of the through-hole 33 having the above-described opening shape, as compared with, for example, a case where a single ceramic body is used as the stem 30.

(Modifications)

Figure 8:
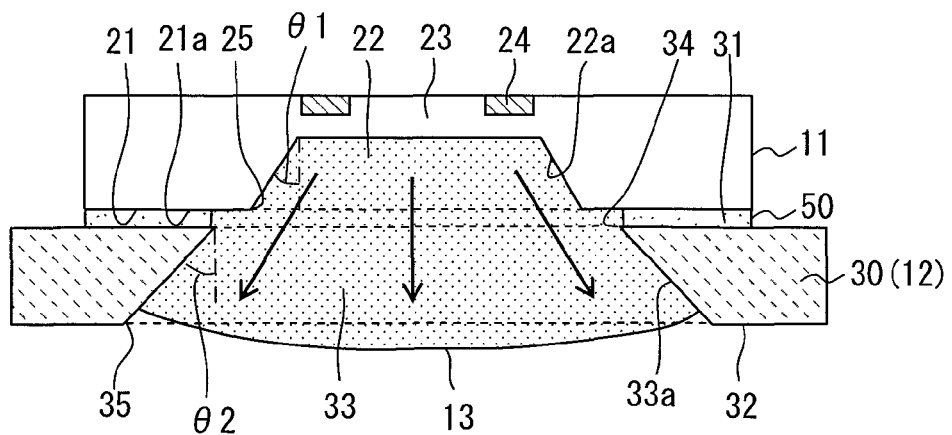
FIG. 8 is a cross sectional view illustrating a first modification of the first embodiment.

In the above-described example, the portion of the through-hole 33 of the stem 30 contacting with the gel member 13 has a stepwise shape. Alternatively, as illustrated in FIG. 8, the opening area of the portion of the through-hole 33 contacting with the gel member 13 may increase as distant from the diaphragm 23. In the example shown in FIG. 8, the through-hole 33 as a whole has such a taper shape that a rate of change in the opening area in the perpendicular direction is constant. In this taper shape, the gel member 13 can easily move in the stem 30 in the direction away from the diaphragm 23. Therefore, the stress acting on the diaphragm 23 can be more efficiently reduced. Furthermore, even if the surface layer of the gel member 13 is hardened due to the acid component, it is possible to suppress the stress acting on the diaphragm 23 while reducing the size of the sensor chip 11, as compared with a case where, for example, the opening area of the stem 30 is constant. The stem 30 shown in FIG. 8 is a single part made of ceramic, resin, metal or the like. Alternatively, the stem 30 may be a ceramic multilayer board having a tapered through-hole, which may be formed by processing each layer of the multilayer board.

Figure 9:
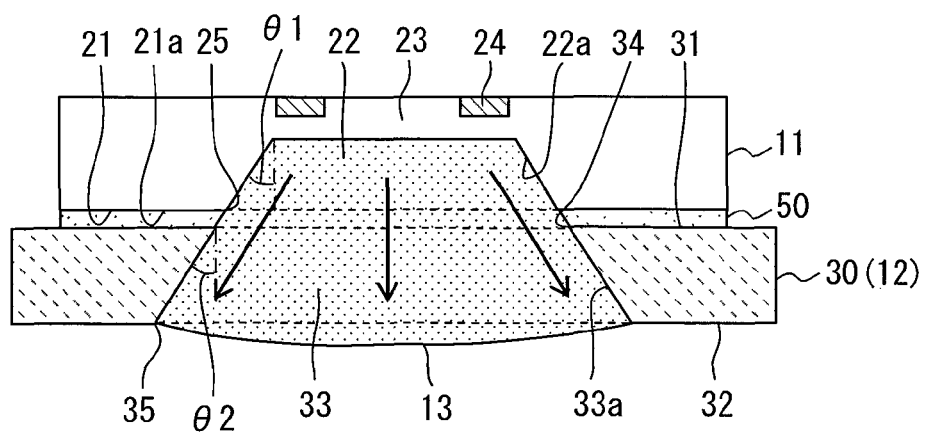
FIG. 9 is a cross sectional view illustrating a second modification of the first embodiment.

Furthermore, in the example shown in FIG. 8, the inner wall 22a of the depressed portion 22 and the inner wall 33a of the through-hole 33 have different inclinations with respect to the perpendicular direction. In other words, the taper angle θ1 of the inner wall 22a of the depressed portion 22 with respect to the perpendicular direction is different from the taper angle θ2 of the inner wall 33a of the through-hole 33 with respect to the perpendicular direction (θ2>θ1). Alternatively, as shown in FIG. 9, the taper angles θ1 and θ1 may be the same. Additionally, the inner wall 22a of the depressed portion 22 of the sensor chip 11 may be flush with the inner wall 33a of the portion of the through-hole 33 contacting with the gel member 13. In other words, the sensor chip 11 and the stem 30 may be bonded to each other and may form a flat surface not having a step (concave-convex) therebetween. This configuration can facilitate the movement of the gel member 13 in the direction away from the diaphragm 23. Therefore, the stress acting on the diaphragm 23 can be more efficiently suppressed. In FIG. 9, the inner peripheral surface of the adhesive layer 50, the inner wall 22a of the depressed portion 22, and the inner wall 33a of the through-hole 33 are flush with each other. The inner peripheral surface of the adhesive layer 50 also has a taper shape. Alternatively, the inner walls 22a and 33a may not be flush with each other although the taper angles θ1, θ2 are the same.

Figure 10:
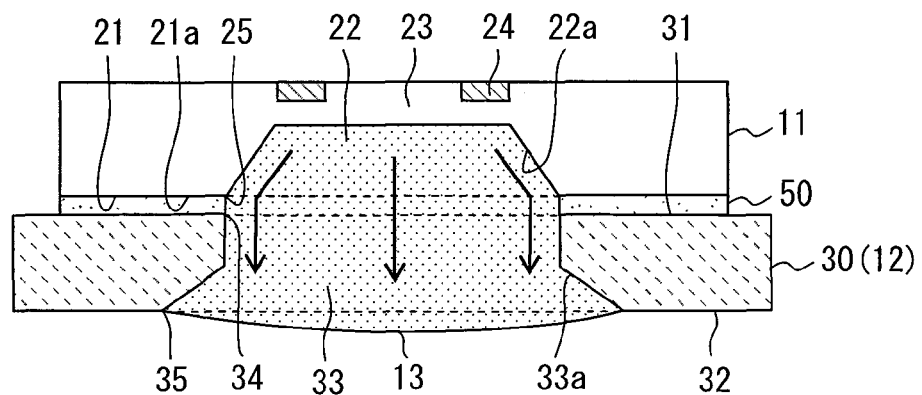
FIG. 10 is a cross sectional view illustrating a third modification of the first embodiment.

In the above-described example, the first inner edge 34 of the stem 30 is located radially outwardly than the second inner edge 25 of the sensor chip 11. Alternatively, as illustrated in FIG. 10, in the direction parallel to the sensor chip mounting surface 31, the first inner edge 34 may coincide with the second inner edge 25 as a whole. For example, in FIG. 10, the opening area of the through-hole 33 of the stem 30 is constant over a region from the edge of the sensor chip mounting surface 31 to the half-way of the through-hole 33. From the halfway of the through-hole 33 to the rear surface 32, the opening area increases with increasing distance from the diaphragm 23. In this configuration, a step formed by a part exposing from the second inner edge 25 of the rear surface is absent at the place where the sensor chip 11 and the stem are bonded to each other. This facilitates the movement of the gel member in the direction away from the diaphragm 23. Therefore, the stress acting on the diaphragm 23 can be more efficiently reduced.

When the adhesive layer 50 is thin in a state where the inner peripheral surface of the adhesive layer 50, the inner wall 22a of the depressed portion 22, and the inner wall 33a of the through-hole 33 are flush with each other as shown in FIG. 9, the first inner edge 34 approaches the second inner edge 25, so that the first and second inner edges 34, 25 almost match each other. FIGS. 8 to 10 show the deformed-state gel member 13. Arrows in the gel member 13 in FIGS. 8 to 10 indicate that the gel member 13 can easily move from the depressed portion 22 toward the through-hole 33. In FIGS. 8 to 10, the part of the pressure transmission passage 33, 43 contacting with the gel member 13 has a certain cross section size at the place farthest from the diaphragm 23 This certain cross section size is larger than the thickness of the gel member 13.

Second Embodiment

Figure 11:
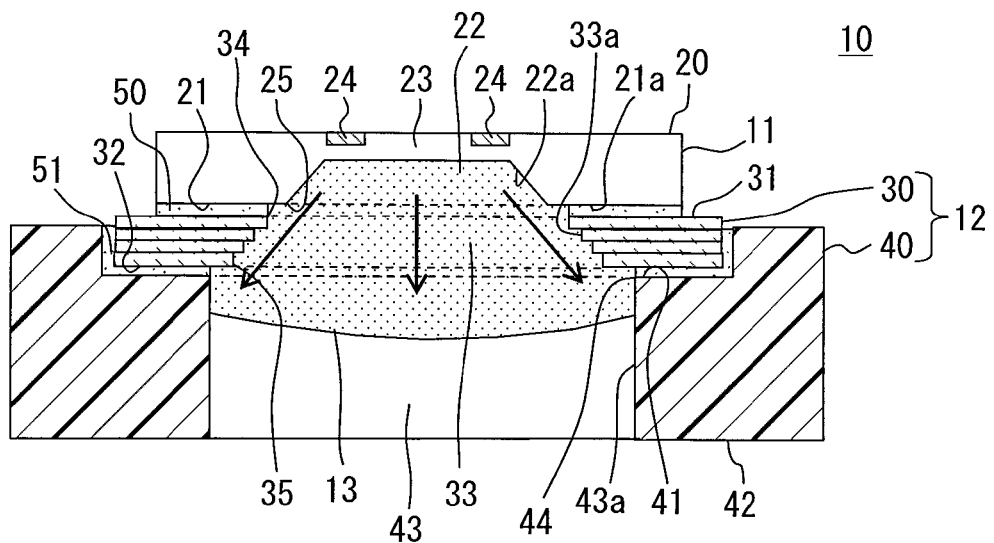
FIG. 11 is a cross sectional view of a pressure sensor of a second embodiment.

In the first embodiment, the gel member 13 continuously fills a region ranging from the depressed portion 22 to the through-hole 33 of the stem. By contrast, in the second embodiment, as shown in FIG. 11, the gel member 13 continuously fills a region ranging from the depressed portion 22 to the through-hole 43 of the case 40. The third inner edge 44, which surrounds the open end of the through-hole 43 on the stem mounting surface 41 of the case 40, faces the rear surface 32 of the stem 30. The pressure sensor 10 shown in FIG. 11 can have substantially the same structure as the pressure sensor 10 of the first embodiment shown in FIG. 1, except for the region filled with the gel member 13. Because of this, in the present embodiment, the third inner edge 44 is located radially outwardly than the fourth inner edge 35, which surrounds the open end of the through-hole 33 on the rear surface 32 of the stem 30. In FIG. 11, the gel member 13 is in a deformed state, and the arrow in the gel member 13 indicates that the gel member 13 can easily move from the depressed portion 22 toward the through-hole 33 and the through-hole 43.

In the present embodiment, like the stem 30 relative to the sensor chip 1, the case 40 does not have a shoulder portion that projects radially inwardly than the inner wall 33a of the through-hole 33 of the stem 30. Because of this, the gel member 13 can easily move from the stem 30 toward the case 40. The movement of the gel member 13 in the direction away from the diaphragm 23 relaxes the stress acting on the stress. Accordingly, the stress due to the deformation of the gel member 13 can be efficiently prevented from acting on the diaphragm 23 and the gauge resistor 24.

In the present embodiment, the opening area of the through-hole 43 of the case 40 is larger than that of the through-hole 33 of the stem 30. Additionally, the through-hole 43 of the case 40 has a straight shape, so that the opening area is constant. Because of this, as is the case in the first embodiment, the part of the pressure transmission passage 33, 43 contacting with the gel member 13 has the minimum opening area at the first inner edge 34 of the stem 30. Additionally, the opening area of the contacting part at the place farthest from the diaphragm 23 is maximum and is larger than the opening area at the first inner edge 34. Furthermore, the opening area of the contacting part at a given place is greater than or equal to that between the given place and the diaphragm 23. Therefore, the second embodiment has substantially the same advantages as the first embodiment.

Moreover, as is in the case in the first embodiment, the part of the pressure transmission passage 33, 43 contacting with the gel member 13 has a certain cross section size (e.g., diameter) at the place farthest from the diaphragm 23. This certain cross section size (e.g., diameter) is larger than the thickness of the gel member 13. Because of this, the stress acting on the diaphragm 23, in particular the stress when the surface layer of the gel member 13 is hardened due to the acid component, can be reduced.

(Modifications)

Figure 12:
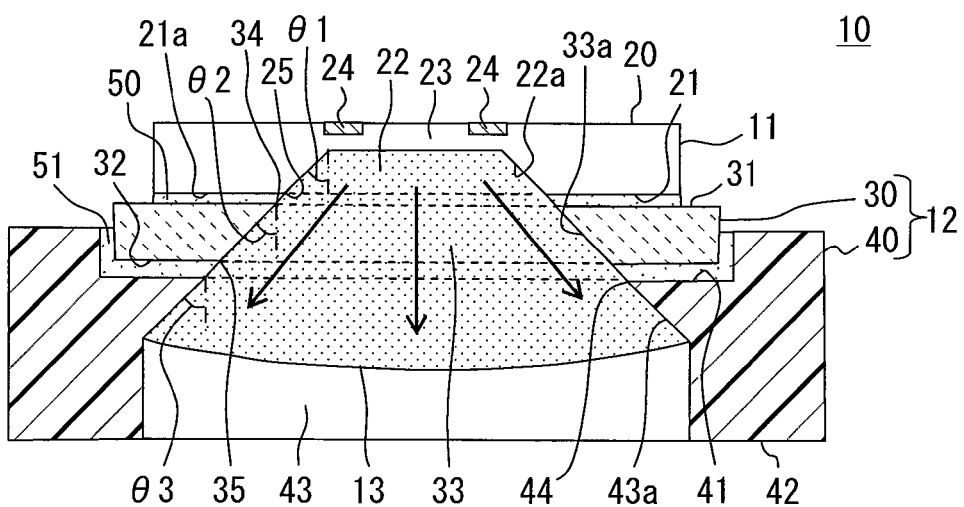
FIG. 12 is a cross sectional view illustrating modification of the second embodiment.

In the above example, the opening area of the through-hole 43 of the case 40 is constant. Alternatively, a portion of the through-hole 43 of the case 40 contacting with the gel member 13 may have the following opening area. The opening area at a given place is greater than or equal to that between the given place and the diaphragm 23. For example, as shown in FIG. 12, the opening area of the portion of the inner wall 43a of the through-hole 43 contacting with the gel member 13 increases as the distance from the diaphragm 23 increases. Specifically, the portion of the gel member 13 contacting with the gel member 13 has such a taper shape that the rate of change of the opening area is constant. A taper angle θ3 of the portion of the inner wall 43a of the through-hole 43 contacting with the gel member 13 with respect to the perpendicular direction coincides with the taper angles θ1 and θ2. In other words, the taper angle of the part of the support member 12 contacting with the gel member 13 is θ2 (=θ3). This taper angle θ2 coincides with the taper angle θ1 of the sensor chip 11. The inner wall 22a of the depressed portion 22 of the sensor chip 11, the inner peripheral surface of the adhesive layer 50, and the inner wall 33a of the through-hole 33 of the stem 30 of the support member 12 are flush with each other. The portion of the inner wall 33a of the through-hole 33 contacting with the adhesive layer 51 is flush with the portion of the inner wall 43a of the through-hole 43 of the case 40 contacting with the gel member 13. In this configuration, the effect of the taper shape and the effect of the flush surfaces can efficiently suppress the stress acting on the diaphragm 23, as is the case in the modification of the first embodiment (see FIG. 9). Furthermore, the gel member 13 has a larger surface area as compared with the case where the opening area of the through-hole 43 is constant. Thus, in the state where the surface layer of the gel member 13 is hardened due to the acid component, the stress acting on the diaphragm 23 can be suppressed. FIG. 12 illustrates the gel member 13 in the deformed state. The arrow in the gel member 13 in FIG. 12 indicates that the gel member 13 can easily move from the depressed portion 22 to the through-hole 33 and the through-hole 43. In FIG. 12 also, the part of the pressure transmission passage 33, 43 contacting with the gel member 13 has a certain cross section size (e.g., a diameter) at the place farthest from the diaphragm 23. This certain cross section size (e.g., a diameter) is larger than the thickness of the gel member 13.

In FIG. 12, a part of the inner wall 43a of the through-hole 43 has a taper shape, and the reset of the inner wall 43a has a straight shape, in which the opening area is constant. Alternatively, when the gel member 13 fills a region to a halfway of the through-hole 43, the inner wall 43a of the through-hole 43 as a whole may be shaped such that the larger the opening area of the through-hole 43, the more distant from the diaphragm 23 the opening area.

In FIG. 12, the three taper angles θ1, θ2, θ3 are substantially the same. Alternatively, the three taper angles θ1, θ2, θ3 may differ from each other. For example, two of the three taper angles θ1, θ2 and θ3 may substantially equal to each other and may differ from the other of the three taper angles θ1, θ2 and θ3. Alternatively, although the taper angles θ1, θ2 and θ3 are the same, the inner walls 22a, 33a and 43a may not be flush with each other. Alternatively, although the taper angles θ1, θ2 and θ3 are the same, the inner walls 22a and 33a may be flush with each other but the inner walls 33a and 43a may not be flush with each other.

In the above, the third inner edge 44 is located radially outwardly than the fourth inner edge 35. Alternatively, the third inner edge 44 may coincide with the fourth inner edge 35 as a whole.

Third Embodiment

Figure 13:
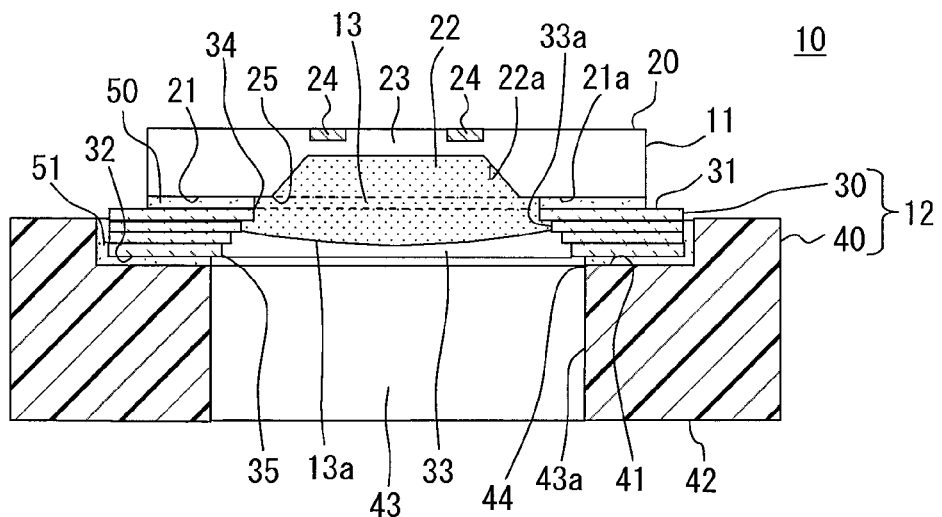
FIG. 13 is a cross sectional view of a pressure sensor of a third embodiment.

In the above embodiments, at the room temperature, the surface of the gel member 13 has a such meniscus shape that the surface is concave in the direction away from the diaphragm 23 (see FIG. 1). By contrast, in the third embodiment, as shown in FIG. 13, at the room temperature, the surface of the gel member 13 has such a meniscus shape that the surface is convex in the direction away from the diaphragm 23. The pressure sensor 10 shown in FIG. 13 can have substantially the same structure as the pressure sensor 10 of the first embodiment (see FIG. 1), except for the surface shape of the gel member 13.

When the surface of the gel member 13 has the meniscus shape and is convex in the direction away from the diaphragm 23, the gel member can more easily move in the direction away from the diaphragm 23 than when the surface of the gel member 13 is flat or concave in the direction away from the diaphragm 23 For example, it is assumed that the surface layer of the gel member 13 is hardened due to the acid component, and the expansion of the gel member 13 deforms the hardened surface layer in the direction away from the diaphragm 23. In this assumed case, when the surface of the gel member 13 is convex in the direction away from the diaphragm 23, the hardened surface layer can more easily deform in the direction away from the diaphragm 23 than when the surface of the gel member 13 is flat or concave. Therefore, the stress acting on the diaphragm 23 can be efficiently suppressed.

Figure 14:
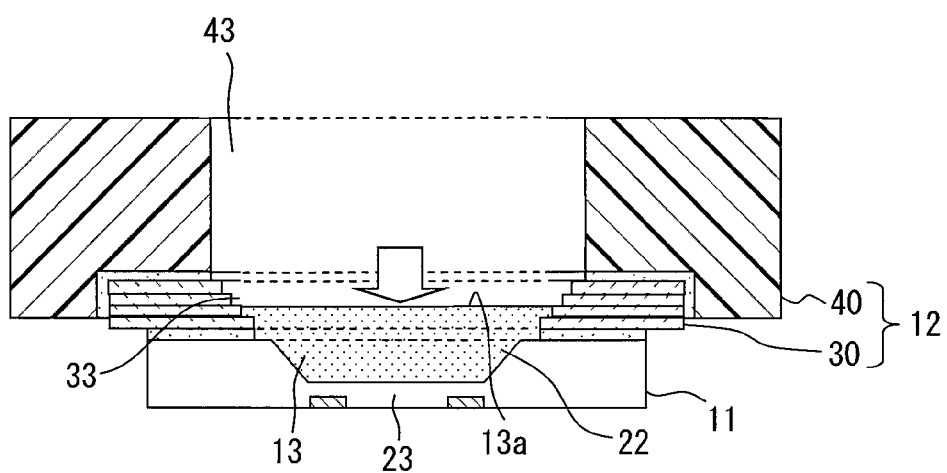
FIG. 14 is a cross sectional view illustrating a process of hardening a gel member in manufacturing a pressure sensor.

The gel member 13 illustrated in FIG. 13 can be formed, for example, in the following way. As shown in FIG. 14, through the through-hole 43 of the case 40, the gel member is injected into a region ranging from the depressed portion 22 of the sensor chip 11 to a halfway of the through-hole 33 of the stem 30. Next, in a state where pressure is applied to the gel member 13 from the surface 13a, the gel member 13 is hardened by, for example, heating. Specifically, in a state where pressure of external atmosphere is made lager than the atmospheric pressure, the gel member 13 is hardened. After this hardening process, the pressure application is released, so that the atmospheric pressure is applied to the surface 13a of the gel member 13. As a result, as shown in FIG. 13, the gel member 13 with the meniscus shape whose convex direction is the direction away from the diaphragm 23 is obtained.

The above embodiments and modifications can be modified, combined, and/or extended.

For example, in the above embodiment, the support member 12 includes the stem 30 serving as the first support part and the case 40 serving as the second support part. However, a structure of the support member 12 is not limited to the above example. The support member 12 may include the first support part without including the second support part. For example, the support member 12 may have a pedestal-absence structure, in which the support member 12 includes the case 40 as the first support part and does not include the stem 30. Alternatively, three or more parts may form the support member 12.

The present disclosure has various aspects. For example, according to one aspect, a pressure sensor comprises a sensor chip, a support member, and a gel member. The sensor chip has a depressed portion, a diaphragm, and a gauge resistor. The depressed portion has an open end on one surface of the sensor chip. The diaphragm defines a bottom of the depressed portion. The gauge resistor is formed on the diaphragm. The support member has a mounting surface facing the one surface of the sensor chip. The mounting surface is a surface to which sensor chip is fixed. The support member defines a pressure transmission passage that has an open end on the mounting surface, and that communicates with the depressed portion. The gel member continuously fills the depressed portion and at least a part of the pressure transmission passage, and protects the diaphragm. In response to transmission of pressure of a pressure medium to the diaphragm through the gel member and deformation of the diaphragm, resistance of the gauge resistor changes. An edge of the open end of the pressure transmission passage on the mounting surface of the support member faces an surrounding region of the open end of the depressed portion on the one surface of the sensor chip. The at least part of the pressure transmission passage, which is in contact with the gel member, has minimum cross sectional area at the open end on the mounting surface and maximum cross sectional area at a place farthest from the diaphragm. The cross sectional area of the at least part of the pressure transmission passage at a given place is greater than or equal to that between the diaphragm and the given place. The support member includes a first support part having the mounting surface. The first support part further has a rear surface opposite to the mounting surface and defines a first pressure transmission passage part penetrating from the mounting surface to the rear surface. The sensor chip is bonded to the mounting surface of the first support part with an adhesive. The first pressure transmission passage part is included in the pressure transmission passage. The cross sectional area of the first pressure transmission passage part at a first location is larger than the cross sectional area of the first pressure transmission passage part at a second location. The first location is the open end of the first pressure transmission passage part on the mounting surface. The second location is a location farthest from the diaphragm among a portion of the first pressure transmission passage part contacting with the gel member. The first support part is a part to which the sensor chip is fixed via only the adhesive.

It should be noted that a viscous resistance depends on shape of an object contacting with a viscous object. Specifically, a concave or convex shape can have a larger contacting area with the viscous object and causes a larger viscous resistance than a plane surface.

According to the above pressure, the edge of the open end of the pressure transmission passage on the mounting surface of the support member does not face the depressed portion of the sensor chip but faces the surrounding region of the open end of the depressed portion on the one surface of the sensor chip. That is, the support member does not have a shoulder portion that projects radially inwardly than an edge of the depressed portion in a direction parallel to the mounting surface. The gel member, which is a viscous object, becomes stiff and deforms at low temperatures (e.g., −30 degrees c or less). When the gel member moves (flows) in order to relax this deformation, the gel member can easily move in the direction away from the diaphragm. When the gel member expands in a high temperature environment, the gel member can easily move in the direction away from the diaphragm.

Moreover, according to the above pressure, the at least part of the pressure transmission passage, which is in contact with the gel member, has minimum cross sectional area at the open end on the mounting surface and maximum cross sectional area at a place farthest from the diaphragm. Additionally, the cross sectional area of the at least part of the pressure transmission passage at a given place is greater than or equal to that between the diaphragm and the given place. Because of these, the gel member can easily move in the pressure transmission passage of the support member in the direction away from the diaphragm.

Moreover, according to the above pressure, the support member includes at least a first support part. The first support part is a part to which the sensor chip is fixed via only the adhesive. Specifically, the first support part may be a single part. The cross sectional area of the first pressure transmission passage part at a first location is larger than the cross sectional area of the first pressure transmission passage part at a second location. The first location is the open end of the first pressure transmission passage part on the mounting surface. The second location is a location farthest from the diaphragm among a portion of the first pressure transmission passage part contacting with the gel member. Because of these, the gel member can easily move in the direction away from the diaphragm as compared with a case where the opening area of the first pressure transmission passage part is constant over a penetrating direction of the first pressure transmission passage part.

Because of the synergy of the above advantages, the pressure sensor can efficiently prevent the stress, which results from the deformation of the gel member, from acting on to the diaphragm and the gauge resistor.

According to the above pressure, furthermore, since the sensor chip is fixed to the first support fart by not anodic bonding but the adhesive, the edge of the pressure transmission passage can face the one surface of the sensor chip. While having the arrangement, the pressure sensor employs not the anodic bonding but the adhesive bonding. Therefore, a bonding strength reduction due to a spark can be prevented.

A positional relationship between the edge of the pressure transmission passage and the region of the one surface of the sensor chip may be such that the edge of the e pressure transmission passage and an edge of the depressed portion coincide with each other in a direction parallel to the mounting surface. Alternatively, the positional relationship may be such that the edge of the e pressure transmission passage is located radially outwardly than the edge of the depressed portion in the direction parallel to the mounting surface.

The above pressure sensor may be configured in the following way. The cross sectional area of the portion of the first pressure transmission passage part contacting with the gel member increases as a distance from the diaphragm increases.

According to the above configuration, since the cross sectional area of the portion of the first pressure transmission passage part increases as a distance from the diaphragm increases, the stress acting on the diaphragm can be more efficiently suppressed.

The above pressure sensor may be configured in the following way. An inner wall of the depressed portion of the sensor chip tapers so that cross sectional area of the depressed portion increases as a distance from the diaphragm in a reference direction increases. The reference direction is a direction from the diaphragm toward the mounting surface and is perpendicular to the mounting surface. A taper angle of the inner wall of the depressed portion of the sensor chip with respect to the reference direction coincides with a taper angle of an inner wall of the at least part of the pressure transmission passage with respect to the reference direction. The inner wall of the depressed portion of the sensor chip is flush with the inner wall of the at least part of the pressure transmission passage.

According to the above configuration, the inner wall of the depressed portion and the inner wall of the contacting part of the pressure transmission passage are flat (not step therebetween). Therefore, the gel member can easily move in the direction away from the diaphragm. The stress acting on the diaphragm can be more efficiently suppressed.

The above pressure sensor may be configured in the following way. The portion of the first pressure transmission passage part contacting with the gel member has a stepwise-shaped inner wall.

The first pressure transmission passage part above first support member has several intervals with different in cross sectional areas. In each interval, the cross sectional area is constant. Because of this, the gel member can easily move in the direction away from the diaphragm as compared with a case where the cross sectional area is constant over the portion of the first pressure transmission passage part contacting with the gel member.

The above pressure sensor may be configured such that the first support part is a ceramic multilayer board. This facilitates the formation of the first pressure transmission passage part having the above-described opening shape, as compared with a case where a single ceramic body is used as the stem 30.

The above pressure sensor may be configured such that a surface of the gel member has a meniscus shape, a convex direction of which is a direction away from the diaphragm.

According to the above, even if a surface layer of the gel member is hardened due to, for example, an acid component of an exhaust gas, the stress acting on the diaphragm can be efficiently suppressed as compared with cases where the surface of the gel member is flat or concave in the direction away from the diaphragm.

The above pressure sensor may be configured in the following way. The support member further includes a second support part. The second support part supports the first support part and defines a second pressure transmission passage part communicating with the first pressure transmission passage part. The second pressure transmission passage part and the first pressure transmission passage part are included in the pressure transmission passage.

In the above configuration, the gel member may continuously fill a region ranging from the depressed portion to a halfway of the first pressure transmission passage part. The gel member may be absent in the second pressure transmission passage part.

According to the above, even if a surface layer of the gel member is hardened due to, for example, an acid component of an exhaust gas, the stress acting on the diaphragm can be efficiently suppressed as compared with cases where the gel member fills the second pressure transmission passage part.

According to the above, even if a surface layer of the gel member is hardened due to, for example, an acid component of an exhaust gas, the stress acting on the diaphragm can be efficiently suppressed as compared with cases where the thickness of the gel member is larger than the cross section size of the part at the place farthest from the gel member.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A pressure sensor comprising:
   a sensor chip having
      a depressed portion that has an open end on one surface of the sensor chip,
      a diaphragm that defines a bottom of the depressed portion, and
      a gauge resistor that is formed on the diaphragm;
   a support member having
      a mounting surface that faces the one surface of the sensor chip, and that is a surface to which the sensor chip is fixed, and
      a pressure transmission passage that has an open end on the mounting surface, and that communicates with the depressed portion; and
   a gel member that continuously fills the depressed portion and at least a part of the pressure transmission passage, and that protects the diaphragm,
   wherein:
   in response to transmission of pressure of a pressure medium to the diaphragm through the gel member and deformation of the diaphragm, resistance of the gauge resistor changes;
   an edge of the open end of the pressure transmission passage on the mounting surface of the support member faces an surrounding region of the open end of the depressed portion on the one surface of the sensor chip;
   the at least part of the pressure transmission passage, which is in contact with the gel member, has minimum cross sectional area at the open end on the mounting surface and maximum cross sectional area at a place farthest from the diaphragm;
   the cross sectional area of the at least part of the pressure transmission passage at a given place is greater than or equal to that between the diaphragm and the given place;
   the support member includes a first support part having the mounting surface;
   the first support part further has a rear surface opposite to the mounting surface and defines a first pressure transmission passage part penetrating from the mounting surface to the rear surface;
   the sensor chip is bonded to the mounting surface of the first support part with an adhesive;
   the first pressure transmission passage part is included in the pressure transmission passage;
   the cross sectional area of the first pressure transmission passage part at a first location is larger than the cross sectional area of the first pressure transmission passage part at a second location;
   the first location is the open end of the first pressure transmission passage part on the mounting surface;
   the second location is a location farthest from the diaphragm among a portion of the first pressure transmission passage part contacting with the gel member; and
   the first support part is a part to which the sensor chip is fixed via only the adhesive.

2. The pressure sensor according to claim 1, wherein:
   the cross sectional area of the portion of the first pressure transmission passage part contacting with the gel member increases as a distance from the diaphragm increases.

3. The pressure sensor according to claim 2, wherein:
   an inner wall of the depressed portion of the sensor chip tapers so that cross sectional area of the depressed portion increases as a distance from the diaphragm in a reference direction increases;
   the reference direction is a direction from the diaphragm toward the mounting surface and is perpendicular to the mounting surface;
   a taper angle of the inner wall of the depressed portion of the sensor chip with respect to the reference direction coincides with a taper angle of an inner wall of the at least part of the pressure transmission passage with respect to the reference direction; and
   the inner wall of the depressed portion of the sensor chip is flush with the inner wall of the at least part of the pressure transmission passage.

4. The pressure sensor according to claim 1, wherein:
   the portion of the first pressure transmission passage part contacting with the gel member has a stepwise-shaped inner wall.

5. The pressure sensor according to claim 2, wherein:
the first support part is a ceramic multilayer board.

6. The pressure sensor according to claim 1, wherein:
a surface of the gel member has a meniscus shape, a convex direction of which is a direction away from the diaphragm.

7. The pressure sensor according to claim 1, wherein:
the support member further includes a second support part;
the second support part supports the first support part and defines a second pressure transmission passage part communicating with the first pressure transmission passage part; and
the second pressure transmission passage part and the first pressure transmission passage part are included in the pressure transmission passage.

8. The pressure sensor according to claim 7, wherein:
the gel member continuously fills a region ranging from the depressed portion to a halfway of the first pressure transmission passage part; and
the gel member is absent in the second pressure transmission passage part.

9. The pressure sensor according to claim 1, wherein:
the part of the pressure transmission passage contacting with the gel member has a cross section size at the place farthest from the gel member; and
the cross section size of the part at the place farthest from the gel member is larger than thickness of the gel member.

* * * * *